May 14, 1957   W. H. WICKERSHAM   2,792,093
MAGNETIC COUPLING DEVICE
Original Filed Nov. 29, 1951

*INVENTOR.*
WILFRED H. WICKERSHAM
BY
*Tyler S Roundy*
ATTORNEY

2,792,093

MAGNETIC COUPLING DEVICE

Wilfred H. Wickersham, Nutley, N. J., assignor to Bendix Aviation Corporation, Teterboro, N. J., a corporation of Delaware Continuation of application Serial No. 258,923, November 29, 1951. This application September 26, 1955, Serial No. 536,534

2 Claims. (Cl. 192—21.5)

This invention relates to magnetic coupling devices. More particularly, the invention relates to magnetic coupling devices of the magnetic drive type or magnetic clutches, and especially magnetic particle clutches, for drivably coupling together a driving member and a driven member. This application is a continuation-in-whole of my copending application Serial No. 258,923, filed November 29, 1951, now abandoned.

The conventional approach in the formation of magnetic particle clutches is to provide two coupling members, usually two parallel discs or concentric cylinders, each rotatable independently of the other about a common axis. The coupling member connected to the power source is called the driving member while the coupling member connected to the load is called the driven member or rotor. In the region between the coupling members, a mixture of finely powdered iron and solid lubricant is retained which effectively solidifies under the influence of the magnetic field established by an associated electromagnet coil. In the presence of this magnetic field, the solidified mixture by magnetic attraction and the resultant frictional wedging action between the coupling members introduces restraining forces which effectively bind together the two coupling members and thereby "engage" the clutch.

Heretofore, it has been customary to make both coupling members of ferromagnetic material because of the relatively low reluctance which a magnetic driven member introduces into the magnetic circuit. In clutch drive applications, particularly those directed to servo systems, the speed of response of a clutch is often of prime importance and is determined by two principal factors: the electrical constants of the coil establishing the magnetic field and its associated circuit, and the dynamic mechanical constants of the moving or coupling members of the clutch. Of particular interest in this instance are the dynamic mechanical constants, the most important of which are the force or torque developed and the inertia of the load or driven member. In certain prior constructions one of the magnetic coupling members, for example the driven member in clutch drive applications, was provided with a limited number of holes in an effort to reduce weight and inertia and in order to minimize caking of the mixture when the electromagnet field coil was deenergized. Although in such construction some of the magnetic lines of force and solidified links of the mixture may extend from one magnetic pole through the holes to the other pole to produce an interlinking action, the remaining majority of links follow the remaining majority of magnetic lines of force which extend from one pole to the other via paths through the solid portions of the magnetic driven member which offer less magnetic reluctance than the hole gap. The provision of holes in the magnetic driven member limits the amount of torque which may be developed, since the field gap is effectively lengthened which decreases the field gradient strength. It will thus be seen that in constructions employing a magnetic driven member with holes the development of torque depends principally upon the phenomenon of magnetic attraction and frictional wedging action and secondarily little upon the phenomenon of interlinking action. In prior constructions, magnetic driven members with a limited number of slots were tried and abandoned as unsuccessful. Prior to the present invention, there were no known magnetic coupling devices employing one non-magnetic cup-shaped member wherein the rim portion was provided with selected apertures located in the magnetic field of the other member so as to receive a principal number of the "solidified" links of the magnetic mixture whereby the total coupling action or total torque is produced principally by the phenomenon of interlinking action rather than by the phenomenon of magnetic attraction or wedging action.

It is an object of the present invention to provide an improved magnetic coupling device.

It is another object of the invention to provide an improved magnetic drive coupling device and to provide an improved magnetic particle clutch.

It is another object of the invention to provide an improved magnetic particle coupling device based upon a new phenomenon and mode of operation wherein one of the coupling members has a novel non-magnetic apertured portion located in the field gap of the other coupling member for improving the operating characteristics of such device.

It is another object of the invention to provide a novel magnetic particle clutch employing an apertured non-magnetic driven member so as to have lower mass and inertia and faster response and yet constructed so as to transmit relatively high torques comparable with the torques transmitted by magnetic particle clutches having magnetic driven members of similar dimensions.

It is a further object of the invention to provide a novel magnetic particle coupling device wherein one of the coupling members has a non-magnetic portion having selected apertures located in the magnetic field gap of the other coupling member and wherein the total coupling action or total developed torque is due principally to a phenomenon of interlinking action by "solidified" links extending through the apertures rather than to a phenomenon of frictional wedging action by "solidified" links of magnetic particles wedged between opposed surfaces of the coupling members.

It is a further object of the invention to provide a novel magnetic particle device wherein one of the coupling members has a non-magnetic portion having apertures located in the magnetic field gap of the other coupling member and wherein the apertures have a selected geometry and distribution such that there is an optimum relationship between total aperture area and total area of the intervening solid parts of such non-magnetic position which define the apertures, whereby an optimum number of the "solidified" links of magnetic particles make direct contact with such intervening solid parts to yield relatively high coupling action or torque.

It is a further object of the invention to provide a successfully operable magnetic coupling device employing a novel slotted member of non-magnetic material as one of the coupling members, the slots being located in the magnetic field of the other coupling member.

The above and other objects and advantages of the present invention will appear more fully hereinafter from a consideration of the detailed description which follows taken together with the accompanying drawing wherein one embodiment of the invention is illustrated.

In accordance with one aspect the present invention contemplates a magnetic coupling device comprising two relatively rotatable coupling members coaxial about a common longitudinal axis, the first coupling member being composed of magnetic material and having annular surfaces defining an annular gap, and means are provided for producing a magnetic field between the annular surfaces and traversing the gap. The second coupling member has an annular rim portion of non-magnetic material, such as aluminum, and extends into the gap, the rim portion being provided with a series of discrete apertures located in the gap so as to be in the magnetic field. A quantity of discrete relatively movable magnetic particles is disposed in the gap and in the series of apertures and form links of mutually attracted or "solidified" magnetic particles attracted to the annular surfaces of the first member and extending therebetween across the annular gap and through respective of the apertures under the influence of the magnetic field to link the coupling members together. The apertures preferably have a geometry and distribution selected to produce an optimum total aperture area, as compared with the total area of the non-apertured rim portions intervening between the apertures, whereby an optimum number of the "solidified" links in the apertures make active direct contact with the edge of such non-apertured intervening rim portions to contribute to the coupling action, and accordingly the total torque or total coupling action between the members is relatively large and is due principally, and preferably entirely, to the links of solidified magnetic material extending through such apertures rather than to frictional wedging action. The series of apertures are preferably in the form of a series of discrete rectangular slots extending along the longitudinal axis of the device and distributed around the circumference of the rim portion, the slots being formed by a series of thin ribs or rib portions extending longitudinally and distributed around the circumference of the rim portion. The circumferential extent or width of each slot is preferably greater than the circumferential extent or width of each rib so that a maximum number of "solidified" links of magnetic particles are able to actively engage the edges of the ribs to contribute to the total coupling action or torque.

The present invention in another aspect contemplates a magnetic coupling device incorporating a novel rotor having a portion made of a non-magnetic light-weight material, such as aluminum, with selected holes or slots formed in such portion and located in the field gap of the other coupling member so as to provide a predetermined relatively large transmitted torque. In this manner, it is possible to obtain a torque output from a clutch employing a non-magnetic rotor which is comparable with that obtained with a ferromagnetic rotor of similar physical dimensions. In addition, an appreciable reduction in mass and rotational inertia can be effected. Since acceleration is inversely proportional to inertia for the same applied torque, this reduction in inertia appears externally as increased acceleration or speed of response. This is very desirable for many servo applications where the performance, when using this power clutch drive, is limited by the restrictions imposed by the rotational inertia of the relatively massive iron rotor. In addition, the problem of damping or stabilizing a servo system employing the low inertia rotor is appreciably simplified.

In the drawing, wherein like reference characters refer to like parts throughout the several views.

Figure 1:
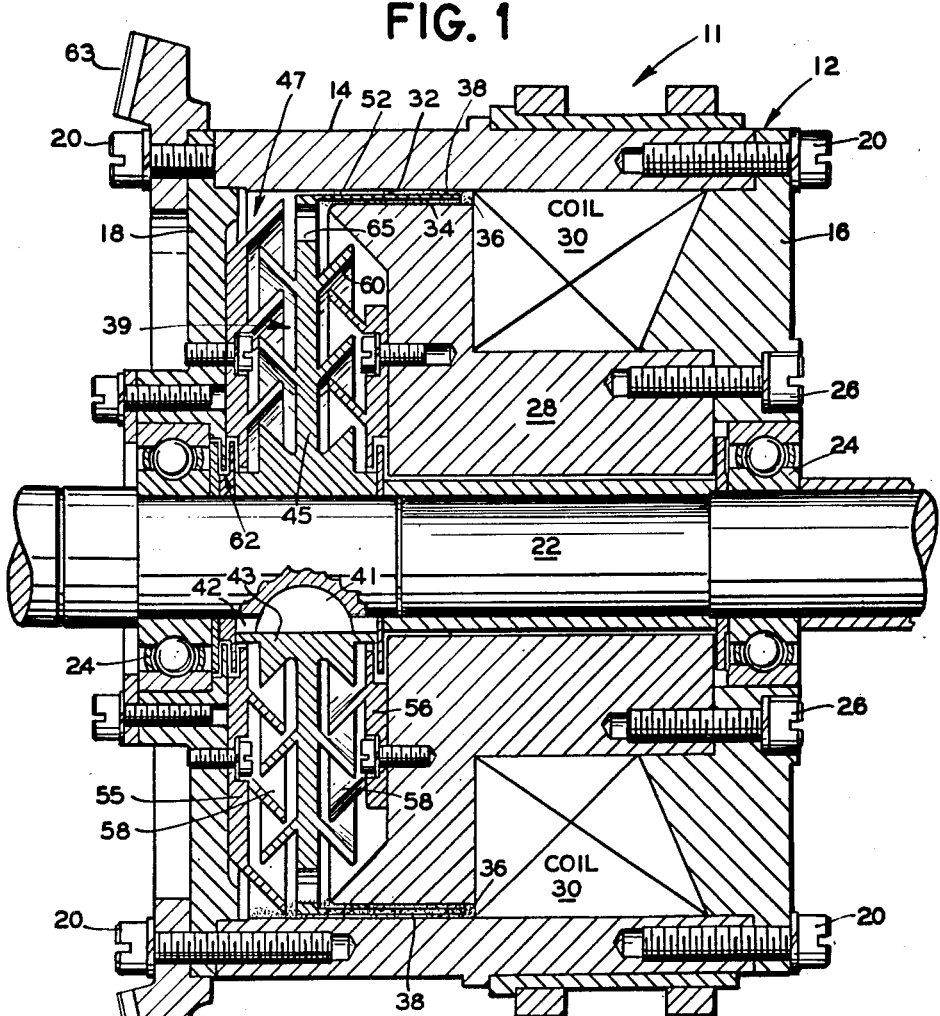
Fig. 1 is an elevational view, in section, of the magnetic particle clutch embodying the present invention.

Referring now to the drawing for a more detailed description of the present invention, and more particularly to Fig. 1 wherein one embodiment hereof is clearly illustrated, a magnetic particle clutch generally designated by the numeral 11 comprises a ferromagnetic driving member 12 which includes a cylindrical-shaped member 14 closed off at its ends by a circular plate 16 and a non-magnetic plate 18, the plates being secured to member 14 by screws 20. Driving member 12 is mounted for rotation on a shaft 22, which extends therethrough, by a pair of bearings 24 retained in plates 16 and 18. Secured to plate 16 by screws 26 is a soft iron core or coil supporting member 28 which accommodates an energizable winding 30. Member 14 and core 28 have opposed and spaced circular face portions 32 and 34, respectively, which define an airgap 36. Face portions 32 and 34 define opposed magnetic pole faces for the magnetic field across airgap 36 which is produced when winding 30 is energized.

Figure 3:
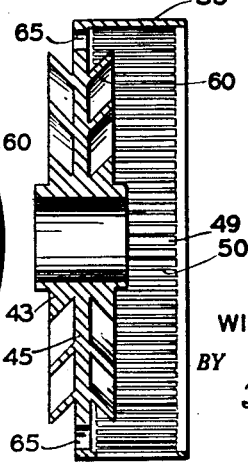
Fig. 3 is a section of the non-magnetic rotor taken along line 3—3 of Fig. 2.

Extending into airgap 36 is the peripheral rim portion 38 of a cup-shaped rotor or driven member 39 which is made of a non-magnetic light weight metal, such as aluminum. Rotor 39 is fixed to shaft 22 by a key 41 which is secured to the shaft and projects into a slot 42 formed in a hub 43 of the rotor. The body or base 45 of rotor 39 is located in a chamber 47 which communicates with airgap 36; the chamber being defined by the inside walls of member 14, plate 18 and core 28. Peripheral rim portion 38 is formed at right angles to base 45 and, as shown in Fig. 3, has formed therein in distributed relation around the circumference of the rim a series of elongated and parallel arranged slots or openings 49 bounded on either side by ribs 50. As shown in Fig. 3, the ribs are thin and the circumferential extent or width of each slot is substantially greater than the circumferential extent or width of each rib, whereby the total slot area is substantially greater than the total rib area and accordingly the driving torque developed in rotor 39 will be due substantially entirely to the phenomenon of interlinking action by the links of magnetic bonding material extending through the slots under the influence of the field rather than by frictional wedging action of any links wedged between solid portions of the rim 38 and the pole faces. In accordance with a feature of the invention the unique geometrical configuration of slots shown in Fig. 3 provides an optimum ratio of aperture area to intervening solid portion area in the non-magnetic rim so that an optimum number of links of magnetic material make active direct contact with solid portions of the rim for maximum driving torque.

In order to provide the driving connection between rotor 39 and driving member 12, a ferromagnetic bonding material or powdered mixture 52 is arranged in the airgap which is adapted to be solidified when a magnetic field traverses the airgap. Bonding material 52 is a mixture of powdered iron and powdered graphite, the percentage by weight being preferably, though not necessarily, of the order of 20 to 1, respectively. The graphite serves as a lubricant for the powdered iron and is known to easily attach to the metal surfaces. The mixture is dust-like and flowable in character and is arranged in the airgap, and consequently, in the slotted portion of rim 38. When winding 30 is energized, bonding material 52 becomes solidified and firmly secures together rotor 39 and driving member 12. It is believed that the establishment of a magnetic field in the airgap containing the mixture causes links or chains to form therein which extend through openings 49 and engage the edges of respective ribs 50 defining the respective slots 49, the links having opposite ends terminating on opposed faces 32 and 34. According to the results obtained, it appears that ribs 50 of rim 38 tend to cut through the links as the driving member is rotated, but are restrained from doing so under no-slip conditions due to the rigidity of the links. Since the ribs cannot cut through the links under no-slip conditions, rotor 39 will be coupled to and carried along with the driving member to rotate shaft 22 which is connected to the load. In this manner, the links cooperate with the ribs to effect a sturdy coupling connection.

Due to the dust-like and flowable characteristics of the mixture when winding 30 is deenergized, means must be provided to direct the particles which leave the gap, back into the airgap and also, to prevent the iron particles from entering the bearings and scoring them. Novel baffle means are provided, which comprise a pair of discs 55 and 56 secured to opposite walls of chamber 47, that is, to the adjacent wall surfaces of plate 18 and core 28, respectively. Discs 55 and 56 have formed integrally thereon concentrically arranged circular lip-portions 58 which project upwardly and in a direction away from the centers of the discs. Cooperating with lip portions 58 on discs 55 and 56 are similarly formed lip-portions 60 on both sides of rotor base 45. Lips 58 and 60 are staggered with respect to each other so that a deviated path is provided for the magnetic particles falling out of the airgap. Since the lips extend toward the airgap (Fig. 1), rotation of the driving member will cause the magnetic particles to be directed toward and into the airgap by centrifugal action. At the same time, lips 58 and 60 serve to obviate leakage of the mixture from driving member 12 because of the resistance presented to the flow of particles by the staggered barrier. Additional means for preventing leakage of the mixture into the bearings are provided in the form of interfitting annular rings which comprise the labyrinth seal 62 adjacent bearing 24 in plate 18. With the arrangement described above, the life of the bearings is lengthened considerably and replacement thereof is infrequent.

Figure 2:
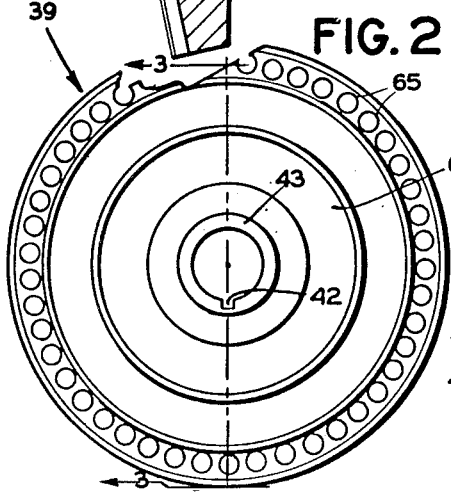
Fig. 2 is a rear elevational view of the cup-shaped non-magnetic rotor used with the clutch of Fig. 1.

As seen in Fig. 1, rotation of driving member 12 is accomplished by way of a bevel gear 63 which is secured to member 12 and the gear is rotated by a companion bevel gear (not shown). Inasmuch as it is desired for a given developed torque to increase the speed of response of rotor 39, openings 65 are cut in base 45 (Fig. 2) adjacent the peripheral edge thereof, thereby effecting an added decrease in rotational inertia of the rotor. Moreover, openings 65 provide for circulation of the mixture on both sides of the base so that the particles may be more readily transmitted therethrough and toward the airgap i. e. without becoming packed in.

It will now be readily apparent that the present invention provides an improved magnetic coupling device and particularly an improved magnetic particle clutch utilizing novel rotor means based upon a new phenomenon and mode of operation which provides relatively high torque and yet decreases the mass and inertia and time of response of the device, thereby making it of increased value in servo systems. The employment of a cup-shaped non-magnetic lightweight rotor for low inertia and yet capable of developing a required high torque is made possible by the novel apertured arrangement, preferably slotted, formed in the peripheral rim portion thereof, whereby an effective connecting bond results to increase the magneto-mechanical coupling of the driving and driven members. The utilization of the described baffle means in a magnetic particle clutch effectively retards leakage of the bonding material from the self-enclosed driving member. Moreover, the baffle means aids in directing the magnetic particles into the airgap.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A magnetic coupling device comprising first and second relatively rotatable coupling members coaxial about a common longitudinal axis, said first coupling member being composed of magnetic material and having annular surfaces defining an annular gap, means for producing a magnetic field between said annular surfaces traversing said gap, said second coupling member having an annular rim portion of non-magnetic material extending into said gap, said rim portion having a series of substantially parallel ribs extending along said longitudinal axis and distributed around the circumference of said rim portion, said ribs defining therebetween a series of longitudinally extending slots located in said gap so as to be in said magnetic field, the circumferential extent of each of said slots being of the same order as the circumferential extent of each of said ribs, and a quantity of relatively movable magnetic particles in said gap and in said series of slots and adapted to form links of mutually attracted magnetic particles attracted to said annular surfaces and extending therebetween across said annular gap and through respective of said slots under the influence of said magnetic field to link said coupling members together.

2. A magnetic coupling device comprising first and second relatively rotatable coupling members coaxial about a common longitudinal axis, said first coupling member being composed of magnetic material and having annular surfaces defining an annular gap, means for producing a magnetic field between said annular surfaces traversing said gap, said second coupling member having an annular rim portion of non-magnetic material extending into said gap, said rim portion having a series of substantially parallel ribs extending along said longitudinal axis and distributed around the circumference of said rim portion, said ribs defining therebetween a series of longitudinally extending slots located in said gap so as to be in said magnetic field, the circumferential extent of each of said slots being larger than the circumferential extent of each of said ribs, and a quantity of relatively movable magnetic particles in said gap and in said series of slots and adapted to form links of mutually attracted magnetic particles attracted to said annular surfaces and extending therebetween across said annular gap and through respective of said slots under the influence of said magnetic field to link said coupling members together.

References Cited in the file of this patent

UNITED STATES PATENTS 2,705,064     Lear _____ Mar. 29, 1955

OTHER REFERENCES

Technical Report 1213, National Bureau of Standards, Washington, D. C. Copy received in U. S. Patent Office on March 30, 1948.